US010498973B1

United States Patent
Zavesky et al.

(10) Patent No.: US 10,498,973 B1
(45) Date of Patent: Dec. 3, 2019

(54) PHYSICAL OBJECT-BASED VISUAL WORKSPACE CONFIGURATION SYSTEM

(71) Applicant: AT&T Intellectual Property I, L.P., Atlanta, GA (US)

(72) Inventors: Eric Zavesky, Austin, TX (US); Zhu Liu, Marlboro, NJ (US); David Crawford Gibbon, Lincroft, NJ (US); Bernard S. Renger, New Providence, NJ (US); Behzad Shahraray, Holmdel, NJ (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/171,902

(22) Filed: Oct. 26, 2018

(51) Int. Cl.
*H04N 5/262* (2006.01)
*H04N 7/14* (2006.01)

(52) U.S. Cl.
CPC ............. *H04N 5/262* (2013.01); *H04N 7/147* (2013.01)

(58) Field of Classification Search
USPC ....................................................... 348/14.07
See application file for complete search history.

(56) References Cited

U.S. PATENT DOCUMENTS

| | | | |
|---|---|---|---|
| 7,612,794 B2 | 11/2009 | He et al. | |
| 8,243,116 B2 | 8/2012 | Qvarfordt et al. | |
| 8,253,770 B2 | 8/2012 | Kurtz et al. | |
| 8,554,217 B2 | 10/2013 | Shin et al. | |
| 8,977,250 B2 | 3/2015 | Malamud et al. | |
| 9,232,189 B2 | 1/2016 | Shaburov et al. | |
| 9,282,285 B2 | 3/2016 | Winterstein et al. | |
| 9,729,824 B2 | 8/2017 | Cutler et al. | |
| 9,800,833 B2 | 10/2017 | Lu et al. | |
| 9,800,931 B1 | 10/2017 | Tangeland et al. | |
| 2006/0268101 A1* | 11/2006 | He | H04N 7/147 348/14.12 |
| 2008/0298571 A1* | 12/2008 | Kurtz | H04N 7/142 379/156 |
| 2016/0241812 A1* | 8/2016 | Lu | H04N 7/15 |
| 2018/0165854 A1 | 6/2018 | Du | |

* cited by examiner

*Primary Examiner* — Amal S Zenati

(57) ABSTRACT

A processing system having at least one processor may establish a communication session between a first communication system of a first user and a second communication system of a second user, the communication session including first video content of a first physical environment of the first user and second video content of a second physical environment of the second user, determine a first visualization action for a first physical object in the first physical environment in accordance with a first configuration setting of the first user for the communication session, obtain the first video content from a first camera of the first communication system, detect the first physical object in the first video content, and perform the first visualization action to modify the first video content. The processing system may then transmit first visualization information including the first video content that is modified to the second communication system.

20 Claims, 3 Drawing Sheets

PHYSICAL OBJECT-BASED VISUAL WORKSPACE CONFIGURATION SYSTEM

The present disclosure relates generally to visual communication sessions, and more particularly to methods, computer-readable media, and devices for providing a communication session including video content of a physical environment that is modified in accordance with a visualization action for a physical object.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
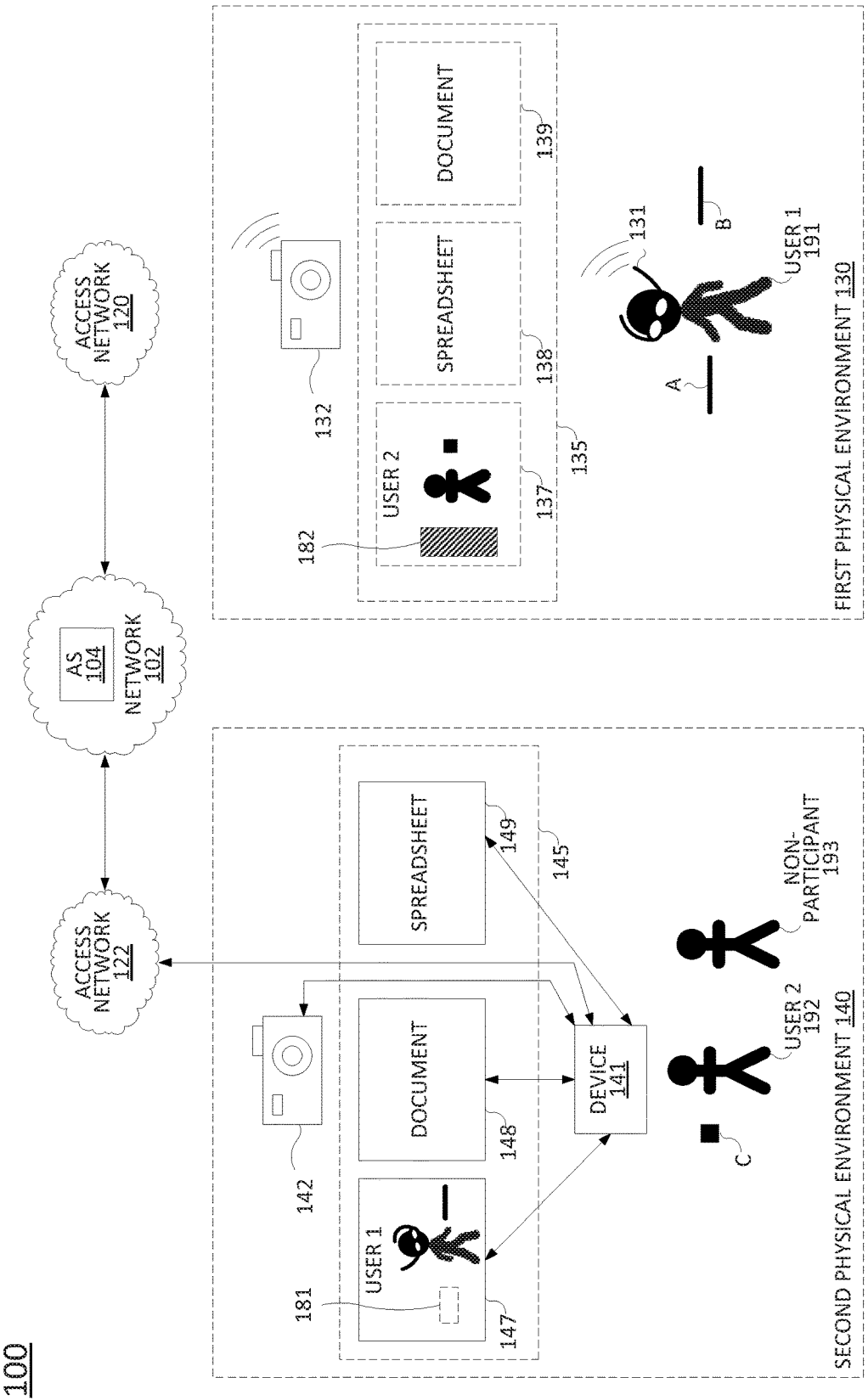
FIG. 1 illustrates an example network related to the present disclosure.

In one example, the present disclosure describes a method, computer-readable medium, and device for providing a communication session including video content of a physical environment that is modified in accordance with a visualization action for a physical object. For instance, in one example, a method may include a processing system having at least one processor establishing a communication session between at least a first communication system of a first user and a second communication system of a second user, the communication session including first video content of a first physical environment of the first user and second video content of a second physical environment of the second user. The processing system may further determine at least a first visualization action for a first physical object in the first physical environment in accordance with a first configuration setting of the first user for the communication session, obtain the first video content from at least a first camera of the first communication system, detect the first physical object in the first video content, and perform the at least the first visualization action to modify the first video content. The processing system may then transmit first visualization information including the first video content that is modified to the second communication system of the second user.

Examples of the present disclosure include processing systems configured to determine local and remote user contexts (e.g., activity, location, etc.) for a visual communication session and to modify workspace environments (e.g., user interfaces) based on the remote and/or local contexts. For instance, examples of the present disclosure may hide, anonymize, or summarize media flows in accordance with privacy and content-sensitivity filters. In one example, a processing system may recreate a workspace environment across different types of hardware and may control outbound media flows to remote parties (e.g., video, portions of a user interface, available tools or other components of such a user interface, and so forth). In addition, in one example, a processing system may also provide automated in-process modification of inbound media flows for a local party at a receiving end of the connection. In one example, different input and display capabilities of a user's communication system are automatically set according to the user's desired configuration for a particular context of the visual communication session.

Augmented reality (AR) and/or mixed realty (MR) applications and video chat usage is increasing. The present disclosure provides specialized configurations for different locations (e.g., home, office, bedside, public park, etc.) and utility (work, play, commuting, etc.). Notably, even if a trusted location such as a home office is used for a workspace environment, the people involved, their activities, the objects or other items in view, and so forth may be automatically detected and validated, e.g., for appropriateness, relevance to the visual communication session, and so forth. In one example, modulations of a workspace (e.g., hiding, removing, blocking, or obfuscating of physical items and/or portions of a user interface) may be in accordance with configuration settings for different types of connections (e.g., work collaboration session, personal call, client meeting, etc.).

In one example, connections and workspaces are optimized based on machine learning-supported intelligent modulations. For example, a processing system may determine configuration settings without user(s) pre-specifying, in accordance with user profile(s) and learned behaviors in connection with certain contexts. In one example, diverse types of workspaces (e.g., a work office, a home office, a mobile virtual office, etc.) may be seamlessly used for video communications with consistent consideration of privacy of the user and others (e.g., non-participants) who may be in the vicinity. As such, examples of the present disclosure provide for mappings of visual communication sessions across different types of contexts, including hardware availability (e.g., desktop computers, mobile computing devices, sensors, cameras, displays, projectors, wearable computing devices, etc.), network capabilities, physical environments (e.g., work, home, public transportation, park), user intents (e.g., work, personal, recreation, etc.), users' moods, users' biometric states, and so on. In addition, in one example, remote equipment and ubiquitous displays (e.g., television projectors, wall panels, microphones, speakers, etc.) may be utilized to create a workspace for a particular communication session. In other words, one or more users/participants in a video communication session may be provided a workspace with devices in a physical environment, without having to necessarily carry a personal computing device, camera, etc. at all times.

In one example, a processing system may schedule a connection based on the parties and the workspace requirements. For instance, the processing system may determine that one of the parties will be in a better context/location at a later time based upon the user's schedule, the availability of different resources as another location or at the same location but at a different time, and so on. In one example, parts of a workspace can be hidden or simplified based on the context (e.g., an available room, tool complexity, etc.). For instance, if low network bandwidth or a visual anomaly is detected, a static presentation of a face or other content could be used instead of live on-camera interaction. In one example, the video frame rate or picture quality may also be modulated to match service conditions.

As devices capable of video-based communication are increasingly installed and/or used in different locations (e.g., bedside, bathroom, etc.), in accordance with the present disclosure extra precautions may be taken to first detect and validate that a video signal should be captured and sent. For example, a user may receive a call for a visual communication session while waking up, and he or she may prefer to not be visible in this condition. Similarly, a user may receive a call after just finishing an exercise session and would also prefer to not be visible. In another example, a user may be in a cluttered living room or kitchen and may prefer that one or more other participants of a visual communication session would not see the mess. In all of these cases, the user may be edited out of the video, blocked, blurred, replaced with a preselected picture or avatar, or the outbound video may be omitted from the visual communication session. However, it should be noted that user interface content of the user's workspace environment may still be transmitted in the outbound direction (e.g., in accordance with configuration settings specific to user interface content). In still another example, a remote user receiving video content from one or more other users may have specific and unique personal preferences regarding what may be considered offensive, explicit, etc., whereas the sending party may not show any concern. In such case, a processing system may also apply inbound filtering of video or other visual information for the recipient with unique personal preferences.

In one example, the present disclosure may include monitoring remote video feeds for persons in need of assistance, for security purposes, or the like, where a visual communication session may be initiated automatically in response to detection of certain contexts. In one example, the present disclosure may include system-controlled wrap-up/shut-down of user workspaces such as disengaging one or more cameras, locking sensitive accounts, disabling some interaction components, and so on. In addition, in one example, historical usage patterns may be used to determine which actions to take during the shut-down procedures.

In one example, a processing system may submit requests to third-parties in an area with appropriate resources to support a workspace in connection with a request to establish a visual communication session. In addition, in one example, a processing system may send requests to automated systems (e.g., fixed cameras, drones, etc.) to respect a zone of privacy around a user engaging in a visual communication session in a public environment. In another example, translation services (e.g., for audio, visual, text, language, etc.) may be applied based on interactions between different parties of the visual communication session.

In still another example, the workspace may also be modulated for "ideal" conditions and connections, such as moving the focus of a pan/tilt/zoom camera, boosting audio, changing a chair height, replacing a background to match what is expected, and so on. These and other aspects of the present disclosure are described in greater detail below in connection with the examples of FIGS. 1-3.

To further aid in understanding the present disclosure, FIG. 1 illustrates an example system 100 in which examples of the present disclosure for providing a communication session including video content of a physical environment that is modified in accordance with a visualization action for a physical object may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
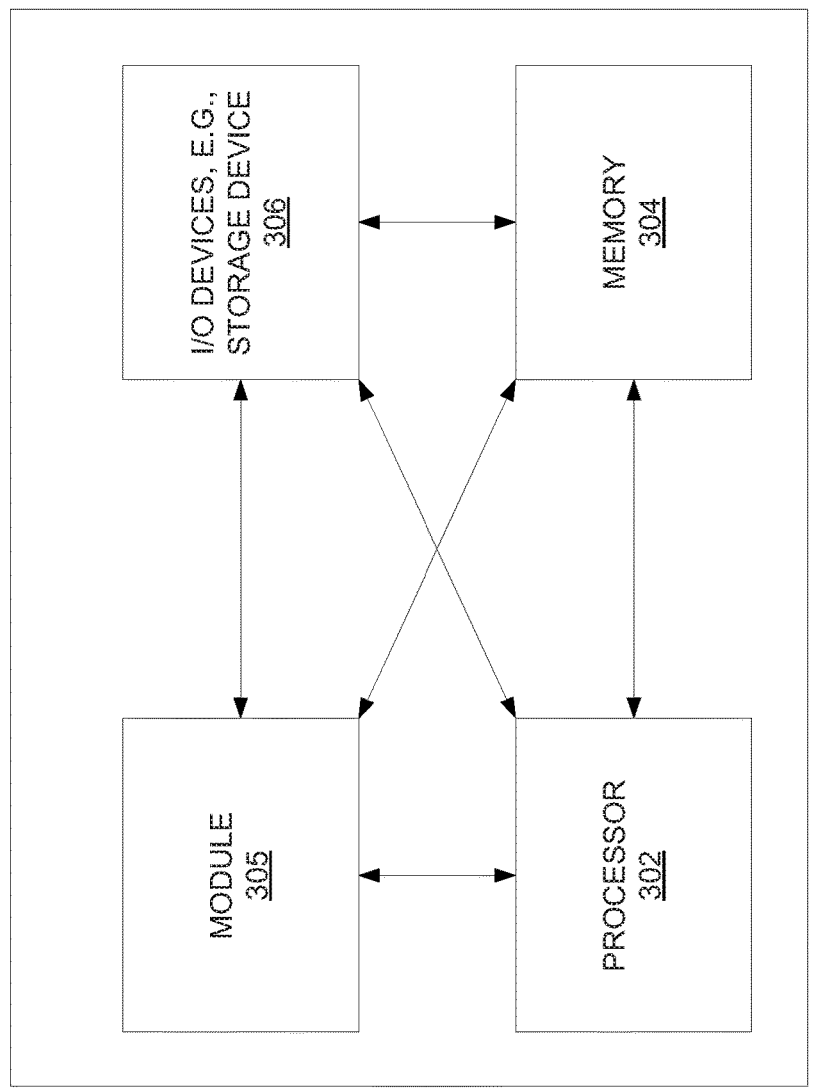
FIG. 3 illustrates a high level block diagram of a computing device specifically programmed to perform the steps, functions, blocks and/or operations described herein.

In accordance with the present disclosure, application server (AS) 104 may comprise a computing system or server, such as computing system 300 depicted in FIG. 3, and may be configured to provide one or more operations or functions for providing a communication session including video content of a physical environment that is modified in accordance with a visualization action for a physical object, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for providing a communication session including video content of a physical environment that is modified in accordance with a visualization action for a physical object, in accordance with the present disclosure. In one example, AS 104 may comprise a physical storage device (e.g., a database server), to store various types of information in support of systems for providing a communication session including video content of a physical environment that is modified in accordance with a visualization action for a physical object, in accordance with the present disclosure. For example, AS 104 may store configuration settings for various users, households, employers, service providers, and so forth that may be processed by AS 104 in connection with establishing visual communication sessions, or that may be provided to devices establishing visual communication sessions via AS 104. AS 104 may further store object models, a lexicon (e.g., of topic models), and so forth which may be utilized by users, households, employers, service providers, and so forth to create configuration settings, e.g., actions to modify videos and/or users interfaces for various contexts. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other type of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a device 131. Similarly, access network 122 may be in communication with one or more devices, e.g., device 141. Access networks 120 and 122 may transmit and receive communications between devices 131 and 141, between devices 131 and 141, and application server (AS) 104, other components of network 102, devices reachable via the internet in general, and so forth. In one example, each of devices 131 and 141 may comprise any single device or combination of devices that may comprise a user endpoint device. For example, the devices 131 and 141 may each comprise a mobile device, a cellular smart phone, a wearable computing device (e.g., smart glasses) a laptop, a tablet computer, a desktop computer, an application server, a bank or cluster of such devices, and the like. In one example, devices 131 and 141 may each comprise programs, logic or instructions for performing functions in connection with examples of the present disclosure for providing a communication session including video content of a physical environment that is modified in accordance with a visualization action for a physical object. For example, devices 131 and 141 may each comprise a computing system or device, such as computing system 300 depicted in FIG. 3, and may be configured to provide one or more operations or functions in connection with examples of the present disclosure for providing a communication session including video content of a physical environment that is modified in accordance with a visualization action for a physical object, as described herein.

In one example, the device 131 is associated with a first user (user 1) 191 at a first physical environment 130. As illustrated in FIG. 1, the device 131 may comprise a wearable computing device (e.g., smart glasses) and may provide a user interface 135 for user 191. For instance, device 131 may comprise smart glasses with an outward facing camera with augmented reality (AR) enhancement capabilities. For instance, endpoint device 131 may have a screen and a reflector to project outlining, highlighting, or other visual markers to the eye(s) of user 191 to be perceived in conjunction with the surroundings. In the present example, device 131 may provide three windows 137-139 in the user interface 135. Also associated with user 191 and/or first physical environment 130 is a camera 132 which may be facing user 191 and which may capture a video comprising the first physical environment 130, including user 191 and other items or objects therein, such as objects A and B. In one example, camera 132 may communicate with device 131 wirelessly, e.g., to provide a video stream of the first physical environment 130. As an alternative, or in addition, device 131 may also comprise an outward facing camera to capture video of the first physical environment 130 from a field of view in a direction that user 191 is looking.

Collectively, the physical environment 130 and user interface 135 may be referred to as a "workspace environment." In one example, the components associated with user 191 and/or first physical environment 130 that are used to establish and support a visual communication session may be referred to as a "communication system." For instance, a communication system may comprise device 131, or device 131 in conjunction with camera 134, device 131 in conjunction with a smartphone or personal computer, a wireless router, or the like supporting visual communication sessions of device 131, and so on.

Similarly, device 141 may be associated with a second user (user 2) 192 at a second physical environment 140. As illustrated in FIG. 1, the device 141 may comprise a personal computer, desktop computer, or the like, and may provide a user interface 145 for user 192 via a plurality of display screens 147-149. The user interface 145 may be similar to user interface 135, but may be provided with physical display screens 147-149 instead of projections of windows 137-139. Also associated with user 192 and/or second physical environment 140 is a camera 142 which may be facing user 192 and which may capture a video comprising the second physical environment 140, including user 192 and other items or objects therein, such as object C and another person, non-participant 193. In one example, camera 142 may be coupled to device 141 and may provide a video stream of the second physical environment 140.

In one example, devices 131 and 141 may communicate with each other and/or with AS 104 to establish, maintain/operate, and/or tear-down a visual communication session. In one example, AS 104 and device 131 and/or device 141 may operate in a distributed and/or coordinated manner to perform various steps, functions, and/or operations described herein. To illustrate, AS 104 may establish and maintain visual communication sessions for various users and may store and implement configuration settings specifying both inbound and outbound modifications of media streams from the various users. The media streams may comprise video content, which may include visual imagery of a physical environment, and which in some cases may further include recorded audio of the physical environment. In one example, the media streams may also include user interface content, which may include visual content (such as documents, text, web browser windows, email client windows, animations, etc.) and/or audio content (such as music or other audio being played, speech of an automated assistant or interactive voice response (IVR) system, and so forth). For example, AS 104 may receive a request to establish a visual communication session from device 131 and/or device 141. The visual communication session may be established for such devices after AS 104 retrieves configuration settings for the user 191 and/or user 192, determines which configuration setting(s) to apply based upon the context(s), and activates the respective filters/configuration setting(s) which are determined to apply to the context(s). The request may be received via access network 120, access network 122, network 102, and/or Internet in general, and the visual communication session may be provided via any one or more of the same networks.

The establishment of the visual communication session may include providing security keys, tokens, certificates, or the like to encrypt and to protect the media streams between device 131 and 141 when in transit via one or more networks, and to allow devices 131 and 141 to decrypt and present received video content and/or received user interface content via user interfaces 135 and 145, respectively. In one example, the establishment of the visual communication session may further include reserving network resources of one or more networks (e.g., network 102, access networks 120 and 122, etc.) to support a particular quality of service (QoS) for the visual communication session (e.g., a certain video resolution, a certain delay measure, and/or a certain packet loss ratio, and so forth). Such reservation of resources may include an assignment of slots in priority queues of one or more routers, the use of a particular QoS flag in packet headers which may indicate that packets should be routed with a particular priority level, the establishment and/or use of a certain label-switched path with a guaranteed latency measure for packets of the visual communication session, and so forth.

In one example, AS 104 may establish a communication path such that media streams between device 131 and device 141 pass via AS 104, thereby allowing AS 104 to implement modifications to video content and/or user interface content in accordance with the applicable configuration setting(s). The configuration settings may be user-specified, may be based upon the capabilities of devices of user 191 and/or user 192 being used for the visual communication session, may be provided by an employer or sponsor of a visual communication session service of network 102 and/or AS 104, may be provided by an operator of network 102 or the system 100 in general, and so forth. As just one example, device 131 may provide information regarding the capabilities and capacities of device 131 and camera 132 to AS 104 in connection with a request to establish a visual communication session with device 141. AS 104 may send a notification of the request to device 141. Similarly, device 141 may provide information regarding the capabilities and capacities of device 141 and camera 142 to AS 104 in connection with a response to the request/notification to establish the visual communication session.

In one example, device 131 and/or device 141 may indicate a purpose for the call (e.g., further context) such as a work collaboration session, a client call, a sales call, a work related call, a non-work related call, e.g., a personal call, etc. In this regard, the user 191 may have previously provided to AS 104 configuration settings to match to different types of calls (e.g., different contexts). In one example, user 191 may have indicated that for a work call, any non-essential objects should be omitted from the video content provided to other users/participants of the visual communication session. In the present example, user 191 may have indicated in the request to establish the visual communication session that the purpose is a work call. In this regard, AS 104 may determine that object A (e.g., a hand-held tablet) is relevant to the visual communication session and that object B (e.g., a family picture of user 191) is not. In one example, the user 191 may pre-specify relevant and/or non-relevant objects for different types of calls. As an alternative, or in addition, AS 104 may include programming, logic, instructions, or the like to determine which objects are relevant. For instance, an image salience detection algorithm may determine that object A is relevant since it is being moved, touched, and/or interacted with by user 191, whereas object B is in the background and static. In still another example, AS 104 may learn over time that user 191 typically interacts with object A during visual communication sessions for "work" and does not typically interact with object B. Thus, AS 104 may add to the configuration setting(s) and/or create a new configuration setting that whenever object B is detected in video content associated with user 191 for a work call, that object B should be omitted. In the present example, and as illustrated in FIG. 1, AS 104 may determine that user 191 is not using object B, and/or that object B is simply present in the video content of the first physical environment 130. Accordingly, AS 104 may omit or edit out object B from the video content prior to forwarding the video content to device 141. Thus, when device 141 shows, e.g., via display 147, the video content of the first physical environment 130 that has been modified, it can be seen in the example of FIG. 1 that the object B has been omitted from the visual imagery in region 181 (shown as a dashed box).

In another example, AS 104 may determine that device 141 does not have sufficient processing or memory capability to render video content of the first physical environment 130 from camera 132 at the full resolution that camera 132 may capture and stream the video content via device 131. As such, AS 104 may receive the video content and may perform one or more modifications to reduce the bitrate, reduce window dimensions (e.g., to crop the video content), to omit portions of the video content, etc. In the present example, and as illustrated in FIG. 1, AS 104 may determine that user 191 is not using object B in the first physical environment 130. Accordingly, AS 104 may omit or edit out object B from the video content prior to forwarding the video content to device 141. Thus, when device 141 presents, e.g., via display 147, the video content of the first physical environment 130 that has been modified, it can be seen in the example of FIG. 1 that the object B has been omitted from the visual imagery in region 181.

In one example, AS 104 may determine that a configuration setting of user 192 is also applicable in the context(s) of the current visual communication session. For example, the user 192 may indicate that no individuals other than user 192 should be visible in the outbound video content of the second physical environment 140. As such, AS 104 may receive video content of the second physical environment 140 captured via camera 142 and transmitted via device 141. AS 104 may then apply a detection algorithm to identify humans in the video content, and then to further apply an identification algorithm to identify user 192. Any other humans not identified as user 192 may then be edited out of the video content. In this case, non-participant 193 may be detected in the video content of second physical environment 140 and may be cut-out, blocked, blurred, etc., by AS 104 before forwarding the video content of the second physical environment 140 to device 131. Thus, when device 131 presents the video content of the second physical environment 140 that has been modified, e.g., in window 137, it can be seen in the example of FIG. 1 that the non-participant 193 has been omitted from the visual imagery in region 182.

The foregoing describes an example of network-based application of configuration settings by AS 104. However, it should be understood that in other, further, and different examples, the application of configuration settings and the modifications of video content in accordance with the configuration settings may alternatively or additionally be applied locally, e.g., at device 131 and/or device 141. As just one example, device 131 may apply a configuration setting to omit unnecessary devices from video content of first physical environment, while AS 104 may apply an employer's configuration settings that are applicable to all user and all contexts. For instance, user 191 may be at home and wearing casual clothing, e.g., shorts and a short sleeve shirt. While user 191 may be unconcerned about his or her appearance, the employer may determine that such apparel is non-professional and that no users (e.g., employees) should be presented in this condition. As such, AS 104 may run an algorithm for detecting casual clothing in the video content, apply the algorithm to the video content of the first physical environment 130, determine that user 191 is wearing casual clothing, and modify the image of user 191 in the video content accordingly, e.g., blocking all or a portion of the user, blurring the user, etc., before forwarding the video content to device 141.

In addition, the foregoing examples describe application of configuration settings/modifications for outbound video content. However, examples of the present disclosure are equally applicable to inbound video content. For instance, user 192 may prefer to conserve local computing resources and may therefore establish a configuration setting for application by AS 104 and/or at device 141 to eliminate unnecessary objects or other items from inbound video content. In the present example, device 131 may send video content of the first physical environment 130 that includes user 191 and objects A and B. However, AS 104 and/or device 141 may determine that object B is not relevant to the context (e.g., a work collaboration session), has not been used by user 191, etc., and may therefore edit object B out of the video content before presentation via display 147. Thus, various additional examples of the same or a similar nature are all contemplated within the scope of the present disclosure.

In one example, all or a portion of users'/participants' user interface content may also be exchanged in a visual communication session in accordance with the present disclosure. In addition, configuration settings may also be provided for users 191 and/or 192, for an employer or service provider, for a network operator, and so on with respect to both outbound and inbound user interface content. As just one example, users 191 and 192 may take turns controlling shared files, e.g., a spreadsheet and a document. User 191 may have the spreadsheet presented in the window 138 and the document presented in the window 139 in user interface 135. In addition, as user 191 manipulates these files, any changes may be propagated to device 141 (e.g., first user interface content of user interface 135). However, user 192 may have a configuration setting (e.g., applied by device 141) which may rearrange the spreadsheet and document to have a different spatial relationship. For instance, in user interface 145, the document is presented via display 148 to the left of spreadsheet 149 presented via display 149.

In still another example, AS 104 may manage the user interface 145 and apply such a configuration setting on behalf of user 192. For instance, AS 104 may comprise a host for a cloud-desktop/cloud computing environment, and device 141 may act as a terminal to present visual and/or audio output in accordance with instructions from AS 104 for rendering the user interface 145. As such, AS 104 may select the particular spatial relationships and orientations of components of the user interface 145 (e.g., video content from the other user 191 via display 147, document via display 148, and spreadsheet via display 149). It should also be noted that the user interface 145 may be initially rendered in accordance with configuration setting(s) of user 192, user 191, an employer, a service provider, etc. determined to be applicable in the context(s) that are found in connection with the visual communication session. However, in one example, user 191 and/or user 192 may also alter or override any changes to video content and/or user interface content that may have automatically been applied, e.g., when not prohibited by an immutable configuration setting as defined by one of the parties, an employer or service provider, etc.

In one example, AS 104 may store a catalog of configuration settings that may be selected for use in visual communication sessions of various users and for various contexts. For instance, AS 104 may have a plurality of available machine learning algorithms or other applications for detecting casual clothing, for detecting clutter, for detecting a bedroom, for detecting a kitchen, for detecting a presence of non-participants, for detecting a public location, for detecting certain content in the user interface content, for detecting unused portions of a user interface (and the user interface content that is transmitted to a recipient/counterparty to the visual communication session via the one or more networks), and so forth. Thus, users, employers, service providers, network operators, etc. may select various configuration settings from such a catalog to be applied by AS 104 and/or for download and application locally at user devices and/or communication systems.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner.

In one example, the system 100 may further include wireless or wired connections to sensors, such as temperature sensors, door sensors, light sensors, movement sensors, etc., to automated devices, such as aerial or vehicular drones (e.g., equipped with global positioning system (GPS) receivers, cameras, microphones, wireless transceivers, and so forth, and which my capture video content of a physical environment), to devices of other users and/or non-participants, and so forth. For instance, in one example, AS 104 may communicate with an automated aerial drone that is detected to be near the first physical environment 130 and/or the second physical environment 140 and transmit a request for the aerial drone to voluntarily respect boundaries of an area around or near the first physical environment 130 and/or the second physical environment 140, e.g., for privacy of users 191 and 192. In another example, device 131 may maintain a first configuration setting when a visual communication session is established. However, a door sensor may communicate with device 131 to indicate that a door has been opened (e.g., to a house of user 191). This may indicate that other individuals may imminently enter the first physical environment 130 and that a second configuration setting should be applicable/activated (e.g., to alter the outbound video content of first physical environment 130 to exclude non-participants who may be potentially captured in the visual imagery, to obfuscate visual imagery of the second physical environment 140 to hide the identities of user 192 and/or non-participant 193, to switch presentation of the user interface 135 from a projection on a wall (e.g., via a projector coupled to device 131 (not shown) to a projection via eyepiece(s) of the device 131, and so on. Thus, these and other modifications are all contemplated within the scope of the present disclosure.

Figure 2:
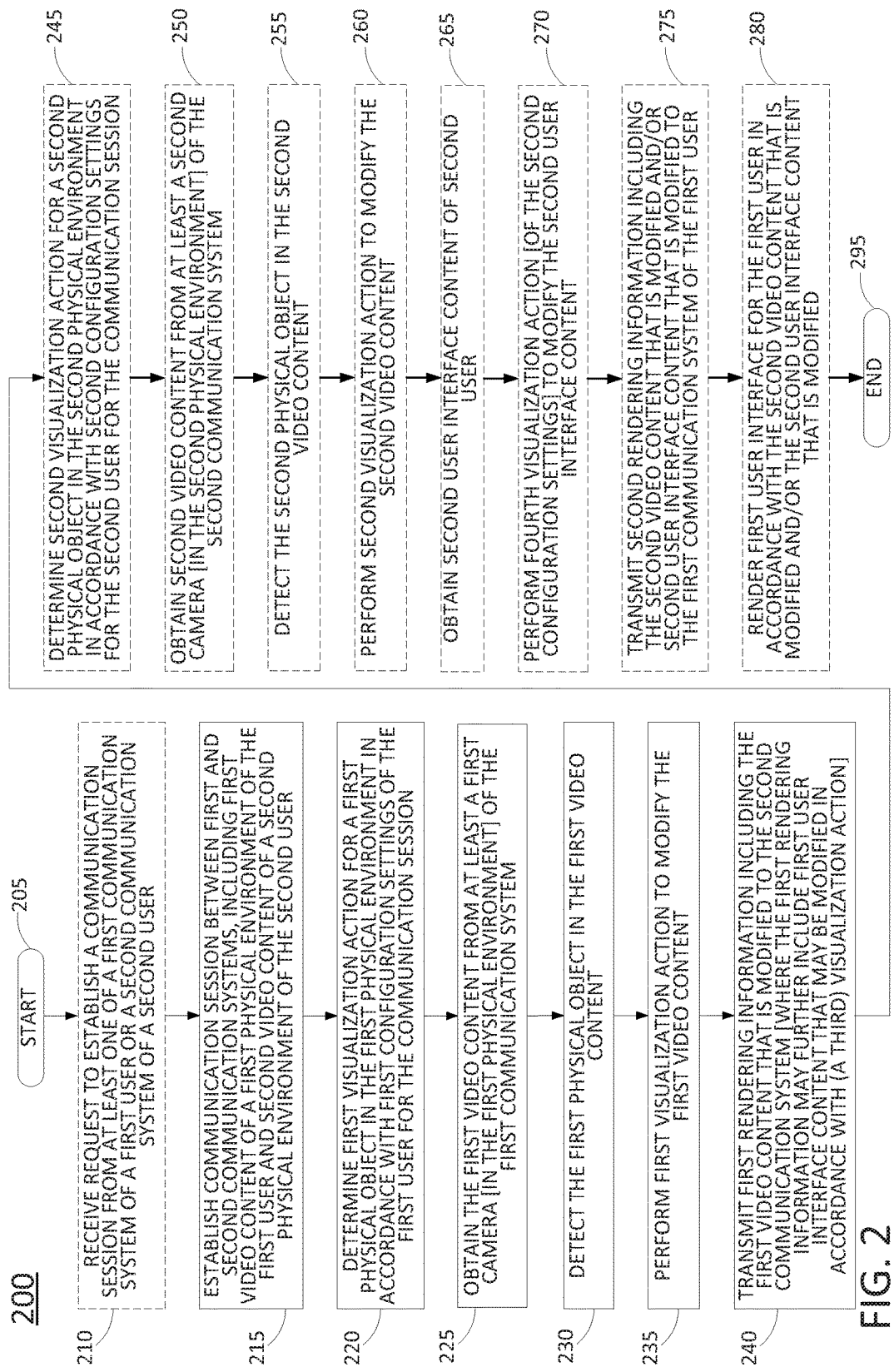
FIG. 2 illustrates a flowchart of an example method for providing a communication session including video content of a physical environment that is modified in accordance with a visualization action for a physical object.

FIG. 2 illustrates a flowchart of an example method 200 for providing a communication session including video content of a physical environment that is modified in accordance with a visualization action for a physical object, in accordance with the present disclosure. In one example, the method 200 is performed by a component of the system 100 of FIG. 1, such as by application server 104, device 131, or device 141, and/or any one or more components thereof (e.g., a processor, or processors, performing operations stored in and loaded from a memory), or by application server 104, in conjunction with one or more other devices, such as device 131, device 141, and so forth. In one example, the steps, functions, or operations of method 200 may be performed by a computing device or system 300, and/or processor 302 as described in connection with FIG. 3 below. For instance, the computing device or system 300 may represent any one or more components of application server 104, device 131, or device 141 in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At optional step 210, the processing system may receive a request to establish a communication session (e.g., a visual communication session) from at least one of a first communication system of a first user or a second communication system of a second user. The processing system may include at least one processor deployed in the first physical environment and/or at least one processor deployed in a communication network. The processing system may alternatively or additionally comprise the first communication system of the first user, the second communication system of the second user, and/or network-based components.

At step 215, the processing system establishes the communication session between the first communication system of a first user and the second communication system of a second user. The communication session may include first video content of a first physical environment of the first user and second video content of a second physical environment of the second user. In one example, the communication session may further comprise first user interface content of the first user (e.g., provided via the first communication system) and second user interface content of the second user (e.g., provided via the second communication system). In one example, step 215 may include reserving network resources of one or more networks to support the communication session.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 220, the processing system determines at least a first visualization action for a first physical object in the first physical environment in accordance with first configuration settings of the first user for the communication session. For instance, the processing system may store and/or access the first configuration settings to determine one or more visualizations actions with respect to the first video content of the first physical environment and/or first user interface content of the first user (e.g., filtering of "outbound" media content). In other words, the first configuration settings may comprise the "first visualization action," a "third visualization action" for modifying a first user interface content of the first user, and so forth.

In one example, the at least the first visualization action for the first physical object may comprise at least one of: removing the first physical object from the first video content, blocking the first physical object in the first video content, or obfuscating the first physical object in the first video content. The at least the first visualization action may be in accordance with at least one of: a capability of the first communication system, a capability of the second communication system, a capability of the processing system, or a network capability. For example, the first user can designate certain objects as being unimportant and which can be dropped from the communication session when local, remote, or network resources are strained. This can be encoded into the configuration settings as a rules-based modification to the first video content.

The first configuration settings may be associated with at least one of: a location of the first physical environment, a time of day, a presence of other individuals besides the first user in the first physical environment, or a type of task for the communication session. For instance, the type of task could be a social call, a work collaboration session, a client meeting, and so forth. The location could be work, home (or more specifically a bedroom, a kitchen, a living room, etc.), an outdoor public place, an indoor public place, and so forth.

In one example, the first configuration settings may further comprise at least a third visualization action for the first user interface content for the communication session. The at least the third visualization action may comprise at least one of: removing at least a portion of the first user interface content, blocking at least a portion of the first user interface content, obfuscating at least a portion of the first user interface content, or altering a location of at least a first portion of the first user interface content with respect to at least a second portion of the first user interface content. In addition, in one example, the first configuration settings may further comprise at least a fourth visualization action for the second user interface content for the communication session. In one example, the first configuration settings may further comprise a fifth visualization action for a third physical object in the second video content for the communication session. For example, the "fourth" and "fifth" visualization actions may comprise filtering of "inbound" media content according to the first configuration settings.

At step 225, the processing system obtains the first video content from at least a first camera of the first communication system, e.g., deployed and/or present in the first physical environment.

At step 230, the processing system detects the first physical object in the first video content. For example, step 230 may include image feature extraction for images in the first video content. In one example, the processing system may use object detection to identify objects from one or more images in the first video content (e.g., based upon features that are useable to distinguish the object from other objects or to separate the object from other aspects of captured digital images, without specifically determining the identities and/or types of the objects). In one example, the processing system may then compare features of identified objects with an object model for the first physical object and/or an object type of the first physical object. In one example, an object model may be associated with a hyper-dimensional space that is representative of visual properties of an object that may be quantified from the first video content. For instance, the object model may comprise a discriminator. The discriminator may comprise a machine learning model that determines whether new data is or is not part of a class represented by training data; in this case the captured measurements/properties of the first physical object. In other examples, the object model may comprise a different type of machine learning model and/or classification algorithm, e.g., a deep neural network (DNN), a multi-class support vector machine (SVM), and so forth. The specific operations of step 230 may vary depending upon the capabilities of the device(s) performing the method 200, the type(s) of video content made available, and so forth.

At step 235, the processing system performs the at least the first visualization action to modify the first video content. For instance, the at least the first visualization action for the first physical object may comprise at least one of: removing the first physical object from the first video content, blocking the first physical object in the first video content, or obfuscating the first physical object in the first video content. The first visualization action may specify removing the object because the object is offensive, proprietary, sensitive, irrelevant, unused, constitutes clutter in the physical environment, etc. Similarly, blocking can be because the object is offensive, proprietary, sensitive, constitutes clutter in the physical environment, etc. In one example, obfuscating may include blurring, but can also comprise using a different representation of the object, such as an avatar or a better version of an image of the object (e.g., a clean kitchen in a picture from an earlier time versus the current video content of a cluttered kitchen). In one example, the processing system further performs at least a third visualization action (e.g., of the first configuration settings) to modify the first user interface content. For example, the processing system may rearrange the spatial relationship between windows containing a document and a spreadsheet, respectively. Various additional modifications of the same or a similar nature may be performed in accordance with the at least the third visualization action.

At step 240, the processing system transmits first rendering information including the first video content that is modified to the second communication system of the second user. For instance, the second communication system is to render a second user interface for the second user in accordance with the first video content that is modified. For instance, at least a portion of the second user interface may display the first video content in a manner accessible to the second user (e.g., via a projection by a wearable device, via a display screen of a personal computer and/or mobile computing device, etc.). In one example, the transmitting of the first rendering information further comprises transmitting the first rendering information including first user interface content that is modified in accordance with the third visualization action.

At optional step 245, the processing system may determine at least a second visualization action for a second physical object in the second physical environment in accordance with second configuration settings for the second user for the communication session. For instance, the second visualization action and the second configuration settings may be similar to the first visualization action and the first configuration settings, however with respect to the second user and his or her preferences, family, work, or service provider requirements, and so on for outbound video content of the second user (e.g., the second video content). The second visualization settings may also include one or more visualization actions for outbound user interface content of the second user (e.g., the second user interface content). In addition, the second configuration settings may also include one or more visualization actions for one or more physical objects in the received video content (e.g., in the first video content from the first user), for one or more aspects of the received user interface content (e.g., first user interface content of the first user), and so forth.

At optional step 250, the processing system may obtain the second video content from at least a second camera of the second communication system, e.g., deployed in the second physical environment. In one example, step 250 may comprise similar operations to step 225 discussed above.

At optional step 255, the processing system may detect the second physical object in the second video content. In one example, step 255 may comprise similar operations to step 230 discussed above.

At optional step 260, the processing system may perform the at least the second visualization action to modify the second video content. In one example, step 260 may comprise similar operations to step 235 discussed above.

At optional step 265, the processing system obtains second user interface content of the second user.

At optional step 270, the processing system may perform at least a fourth visualization action (e.g., of the first configuration settings) to modify the second user interface content. For instance, the first configuration settings of the first user may specify one or more visualization actions for inbound user interface content, such as reordering the spatial relationship of windows for spreadsheets, documents, and so forth, filtering out visual information that is unnecessary or offensive, and so on.

At optional step 275, the processing system may transmit second rendering information including the second user interface content that is modified to the first communication system of the first user. For instance, the first communication system may render a first user interface for the first user in accordance with the second user interface content that is modified. In one example, the first communication system may render the first user interface for the first user in accordance with second video content that is modified and in accordance with the second user interface content that is modified.

At optional step 280, the processing system may render the first user interface for the first user in accordance with the second user interface content that is modified. In one example, the processing system may render the first user interface for the first user in accordance with second video content that is modified and in accordance with the second user interface content that is modified. In one example, the rendering of the first user interface for the first user comprises presenting the second video content that is modified (and/or the second user interface content that is modified) via at least one display device of the first communication system. In one example, the rendering further comprises obtaining the second video content from the second communication system.

In one example, the rendering further comprises presenting the first user interface content of the first communication system. For example, the first user's own user interface content may be presented in addition to the second video content of the second user that is modified and/or the second user interface content of the second user (that may also be modified in accordance with configuration settings of the first user, the second user, or both). As just one additional example, the first configuration settings may comprise a fifth visualization action for a third physical object in the second video content for the communication session. In such an example, the rendering of optional step 280 may further comprise performing the at least the fifth visualization action to modify the second video content, where the presenting the second video content comprises presenting of the second video content that is modified. In one example, optional steps 275 and 280 may be performed by a processing system including the first communication system, network-based components, and/or the second communication system. Alternatively, or in addition, step 275 may be performed by a processing system comprising network-based components, and step 280 may be omitted.

Following step 240, or any of the optional steps 245-280 the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 220-240 to continue to receive first video content, to apply the first visualization action to the first physical object, etc. In one example, the first configuration settings and/or the second configuration settings may further specify conditions for modifying audio aspects of the first video content, the second video content, the first user interface content, and/or the second user interface content, such as objectionable speech, the voice(s) or sound(s) of non-participants, non-relevant background music or other noises, and so forth. In another example, the first configuration settings and/or the second configuration settings may further specify conditions for modifying text context (e.g., in user interface content or in video content), such as blocking, obfuscating, or omitting sensitive text, proprietary text, text that is covered by a non-disclosure agreement, and so on. For instance, the method may include, for video content, optical character recognition (OCR) image processing to extract text from one or more images/frames and then comparing the text to a list of one or more words/phrases associated with modifications of the video content and stored in the first or second configuration settings.

In still another example, the method 200 may be expanded to include topic (e.g., theme and/or concept) detection and then selecting configuration settings for the first user and/or the second user in accordance with the topic. For instance, the processing may apply topic models (e.g., classifiers) for a number of topics to the first video content, the second video content, the first user interface content, and/or the second user interface content to identify a topic. The topic model classifiers can be trained from any text, video, image, audio and/or other types of content to recognize various topics, which may include objects like "car," scenes like "outdoor," and actions or events like "baseball." Topic identification classifiers may include support vector machine (SVM) based or non-SVM based classifiers, such as neural network based classifiers and may utilize the same or similar features extracted from the first video content, the second video content, the first user interface content, and/or the second user interface that may be used to identify objects for modification in accordance with first configuration settings and/or second configuration settings. Once a topic is identified, the topic may be further correlated with configuration settings for work collaboration, client meeting, family, personal call, etc. For instance, a topic of "baseball" may be mapped to configuration settings for "personal call" rather than "work collaboration." The mapping(s) may be provided by the users, a head of household, an employer, a provider of a visual communication session service, and so forth. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for providing a communication session including video content of a physical environment that is modified in accordance with a visualization action for a physical object, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for providing a communication session including video content of a physical environment that is modified in accordance with a visualization action for a physical object (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing a communication session including video content of a physical environment that is modified in accordance with a visualization action for a physical object (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    establishing, by a processing system including at least one processor, a communication session between at least a first communication system of a first user and a second communication system of a second user, the communication session including first video content of a first physical environment of the first user and second video content of a second physical environment of the second user;
    determining, by the processing system, at least a first visualization action for a first physical object in the first physical environment in accordance with a first configuration setting of the first user for the communication session, wherein the first configuration setting indicates that a non-essential object should be removed from the first video content;
    obtaining, by the processing system, the first video content from at least a first camera of the first communication system;
    detecting, by the processing system, the first physical object in the first video content;
    determining, by the processing system in accordance with an image salience detection algorithm, that the first physical object is deemed to be the non-essential object;
    performing, by the processing system, the at least the first visualization action to modify the first video content, wherein the at least the first visualization action comprises removing the first physical object from the first video content in accordance with the first configuration setting when it is determined that the first physical object is the non-essential object; and
    transmitting, by the processing system, first rendering information including the first video content that is modified to the second communication system of the second user.

2. The method of claim 1, wherein the second communication system is to render a second user interface for the second user in accordance with the first video content that is modified.

3. The method of claim 1, wherein the at least the first visualization action is in accordance with at least one of:

a capability of the first communication system;
a capability of the second communication system;
a capability of the processing system; or
a capability of a network supporting the communication session.

4. The method of claim 1, further comprising:
determining at least a second visualization action for a second physical object in the second physical environment in accordance with a second configuration setting for the second user for the communication session;
obtaining the second video content from at least a second camera of the second communication system;
detecting the second physical object in the second video content;
performing the at least the second visualization action to modify the second video content.

5. The method of claim 4, further comprising at least one of:
transmitting second rendering information including the second video content that is modified to the first communication system of the first user, wherein the first communication system is to render a first user interface for the first user in accordance with the second video content that is modified; or
rendering the first user interface for the first user in accordance with the second video content that is modified.

6. The method of claim 1, wherein the communication session further comprises:
first user interface content of the first user; and
second user interface content of the second user.

7. The method of claim 6, wherein the first configuration setting comprises at least a third visualization action for the first user interface content for the communication session, wherein the transmitting the first rendering information further comprises:
transmitting the first rendering information including the first user interface content that is modified in accordance with the at least third visualization action.

8. The method of claim 7, wherein the at least the third visualization action comprises at least one of:
removing at least a portion of the first user interface content;
blocking at least a portion of the first user interface content;
obfuscating at least a portion of the first user interface content; or
altering a location of at least a first portion of the first user interface content with respect to at least a second portion of the first user interface content.

9. The method of claim 7, wherein the first configuration setting comprises at least a fourth visualization action for the second user interface content for the communication session, wherein the method further comprises:
obtaining the second user interface content; and
performing the at least the fourth visualization action to modify the second user interface content.

10. The method of claim 9, further comprising at least one of:
transmitting second rendering information including the second user interface content that is modified to the first communication system of the first user, wherein the first communication system is to render a first user interface for the first user in accordance with the second user interface content that is modified; or
rendering the first user interface for the first user in accordance with the second user interface content that is modified.

11. The method of claim 1, further comprising:
rendering a first user interface for the first user, wherein the rendering comprises:
presenting the second video content via at least one display device of the first communication system.

12. The method of claim 11, wherein the rendering further comprises:
obtaining the second video content from the second communication system.

13. The method of claim 11, wherein the rendering further comprises:
presenting first user interface content of the first communication system.

14. The method of claim 11, wherein the first configuration setting comprises at least a fifth visualization action for a third physical object in the second video content for the communication session.

15. The method of claim 14, wherein the rendering further comprises:
performing the at least the fifth visualization action to modify the second video content, wherein the presenting the second video content comprises presenting the second video content that is modified.

16. The method of claim 1, further comprising:
receiving a request to establish the communication session from at least one of the first communication system or the second communication system.

17. The method of claim 1, wherein the first configuration setting is associated with at least one of:
a location of the first physical environment;
a time of day;
a presence of at least one other individual besides the first user in the first physical environment; or
a type of task for the communication session.

18. A non-transitory computer-readable medium storing instructions which, when executed by a processing system including at least one processor, cause the processing system to perform operations, the operations comprising:
establishing a communication session between at least a first communication system of a first user and a second communication system of a second user, the communication session including first video content of a first physical environment of the first user and second video content of a second physical environment of the second user;
determining at least a first visualization action for a first physical object in the first physical environment in accordance with a first configuration setting of the first user for the communication session, wherein the first configuration setting indicates that a non-essential object should be removed from the first video content;
obtaining the first video content from at least a first camera of the first communication system;
detecting the first physical object in the first video content;
determining, by the processing system in accordance with an image salience detection algorithm, that the first physical object is deemed to be the non-essential object;
performing the at least the first visualization action to modify the first video content, wherein the at least the first visualization action comprises removing the first physical object from the first video content in accordance with the first configuration setting when it is determined that the first physical object is the non-essential object; and transmitting first rendering information including the first video content that is modified to the second communication system of the second user.

19. A device comprising:

a processing system including at least one processor; and a computer-readable medium storing instructions which, when executed by the processing system, cause the processing system to perform operations, the operations comprising:

establishing a communication session between at least a first communication system of a first user and a second communication system of a second user, the communication session including first video content of a first physical environment of the first user and second video content of a second physical environment of the second user;

determining at least a first visualization action for a first physical object in the first physical environment in accordance with a first configuration setting of the first user for the communication session, wherein the first configuration setting indicates that a non-essential object should be removed from the first video content;

obtaining the first video content from at least a first camera of the first communication system;

detecting the first physical object in the first video content;

determining, by the processing system in accordance with an image salience detection algorithm, that the first physical object is deemed to be the non-essential object;

performing the at least the first visualization action to modify the first video content, wherein the at least the first visualization action comprises removing the first physical object from the first video content in accordance with the first configuration setting when it is determined that the first physical object is the non-essential object; and transmitting first rendering information including the first video content that is modified to the second communication system of the second user.

20. The device of claim 19, wherein the second communication system is to render a second user interface for the second user in accordance with the first video content that is modified.

* * * * *